United States Patent
Hubler

[11] 3,860,029
[45] Jan. 14, 1975

[54] VALVE SYSTEM

[75] Inventor: Peter Hubler, Winterthur, Switzerland

[73] Assignee: Sulzer Brothers Ltd., Winterthur, Switzerland

[22] Filed: Sept. 17, 1973

[21] Appl. No.: 397,932

[30] Foreign Application Priority Data
Sept. 22, 1972 Switzerland.................... 13927/72

[52] U.S. Cl.............. 137/487.5, 74/89.15, 318/481
[51] Int. Cl.... F16k 17/00, H02p 3/00, H02p 15/00
[58] Field of Search........ 137/487.5, 488, 492, 529, 137/467, 489.5, 492.5; 251/248, 133, 136, 75; 74/424.8, 89.15; 318/481

[56] References Cited
UNITED STATES PATENTS

| | | | |
|---|---|---|---|
| 3,108,487 | 10/1963 | Sandler | 251/248 X |
| 3,308,846 | 3/1967 | Yuile | 137/487.5 |
| 3,505,888 | 4/1970 | Denkowski | 251/133 X |
| 3,548,866 | 12/1970 | Kaiser | 137/487.5 |
| 3,704,853 | 12/1972 | Waller | 251/136 |

*Primary Examiner*—Martin P. Schwadron
*Assistant Examiner*—Robert J. Miller
*Attorney, Agent, or Firm*—Kenyon & Kenyon Reilly Carr & Chapin

[57] ABSTRACT

The control valve is controlled in dependence on the pressure condition of the fluid flowing into the valve inlet. The valve closure member is under a biasing force independent of the electric motor to be moved into an open end position. In addition, the motor provides a force opposed to the biasing force to keep the valve closed. In order to release the closure member, the effect of the motor on the closure member is controlled via a switch, clutch or brake so that upon an increase in pressure over a set limit in the line to the valve, the closure member becomes biased into the open position.

8 Claims, 6 Drawing Figures

VALVE SYSTEM

This invention relates to a valve system. More particularly, this invention relates to a control system for a valve in a fluid system.

Briefly, the invention provides a valve system comprising a fluid flow control valve, an electric motor and a transmission between the valve and motor. The valve includes a closure member for controlling a flow of fluid through the valve and a means for biasing the closure member towards a predetermined end position under a biasing force. The transmission is connected to the closure member and includes a non-self-locking nut and screw drive.

In addition, the valve system comprises a means for resisting the biasing force, a means for sensing a predetermined condition in the fluid upstream of the valve and a means for releasing the biasing-force resisting means in response to the fluid condition exceeding a preset value in order to allow the closure member to move to the end position under the biasing force.

The valve system is such that, at least during operation, the biasing force is independent of the electric motor and tends to move the valve closure member to the predetermined end position.

With this system, the valve can perform an overload safety or like function in addition to a normal function of controlling the flow of fluid. The biasing force which is independent of the electric motor may, for example, be provided by a spring or by the pressure of the fluid controlled by the valve or may be a combination of a spring and this pressure. The force-resisting means may be provided by having the electric motor afford a force which opposes the biasing force. In this case, the releasing means may include a switch in the supply leads of an electrical circuit to the electric motor.

In another embodiment, the releasing means comprises a clutch in the transmission and between the electric motor and the screw drive. In such an arrangement, the electric motor will normally be supplied with power even when the closure member of the valve is stationary in order to provide a resistance to the biasing force.

In an alternative embodiment, the force-resisting means comprises a brake on the transmission and the releasing means is arranged to release the brake.

One use of the valve system according to the invention is in a steam power plant provided with a by-pass around a prime mover supplied with steam from a steam generator. By incorporating the valve system in the by-pass, the valve can act as the normal by-pass valve and can also perform the function of the safety valve which would otherwise be required. In such a case, the valve can be constructed to move rapidly to the full open position when the value of the condition, e.g. pressure in the line to the valve passes beyond a predetermined value.

Another possible application is in a nuclear steam power plant in which the valve is located in a steam line between a steam generator and a prime mover and is required to move rapidly to the closed position if a critical safety value is exceeded.

In most cases, the condition of the fluid flow controlled by the valve which controls the holding means will be the pressure of the fluid but other possibilities include the temperature or the rate of flow of the fluid.

These and other objects and advantages of the invention will become more apparent from the following detailed description and appended claims taken in conjunction with the accompanying drawings in which:

Figure 1:
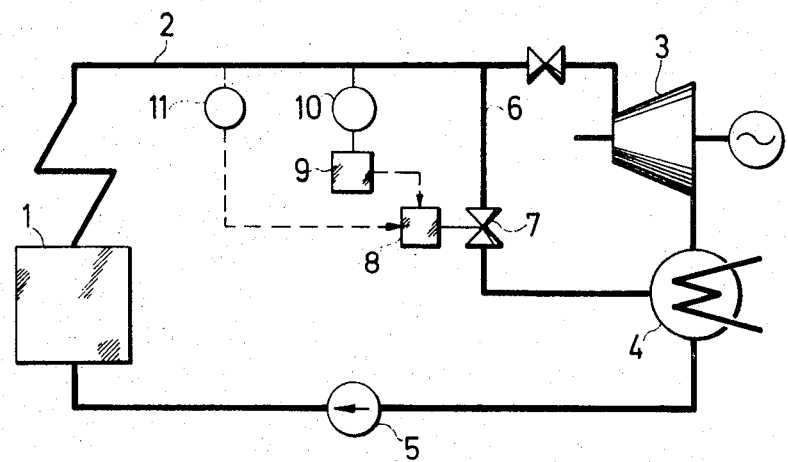
FIG. 1 illustrates a diagrammatic view of a steam power plant containing a valve system embodying the invention.

Referring to FIG. 1, a steam plant includes a steam generator 1 which is connected via a live steam line 2 to a steam load 3, for example, a turbine driving an electricity generator. The steam load 3 is connected via a condenser 4 and a pump 5 to the steam generator 1. A by-pass line 6 which by-passes the steam load 3 branches off from the live steam line 2 and leads to the condenser 4. The line 6 contains a valve 7 the drive 8 of which is indicated by a block which is shown in greater detail in FIG. 2.

Normally, i.e. during starting up, at part-load and full-load of the steam power plant, the valve 7 is subject to the influence of a pressure-sensitive element 10 which acts on the drive 8 of the valve 7 via a controller 9. On starting up and at part-load, the valve 7 is brought into a partially open position depending upon the pressure measured by the pressure-sensitive element 10, while at full-load the valve is kept in the closed position under the control of the pressure-sensitive element 10.

In addition to the pressure-sensitive element 10, a means for sensing a condition of the fluid, such as a pressure-sensitive element 11, is connected to the live steam line 2 and is also connected to the drive 8 and overrides the influence of the pressure-sensitive element 10 when the pressure in the live steam line 2 exceeds a given critical value, for example, when the flow of steam to the load 3 is shut off. In that case, the valve 7 is open into an end position so that the steam flows from the line 2 via the line 6 to the condenser 4.

Figure 3:
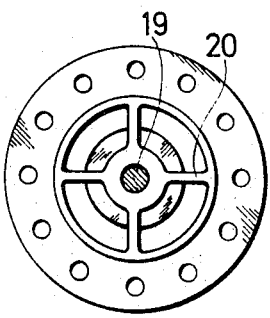
FIG. 3 illustrates a view taken on line A-B of FIG. 2.
Figure 2:
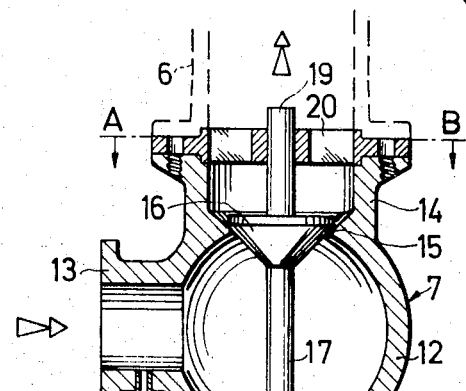
FIG. 2 illustrates a diagrammatic view of the valve system of FIG. 1 including a longitudinal section through the valve and the valve drive.
Figure 2:
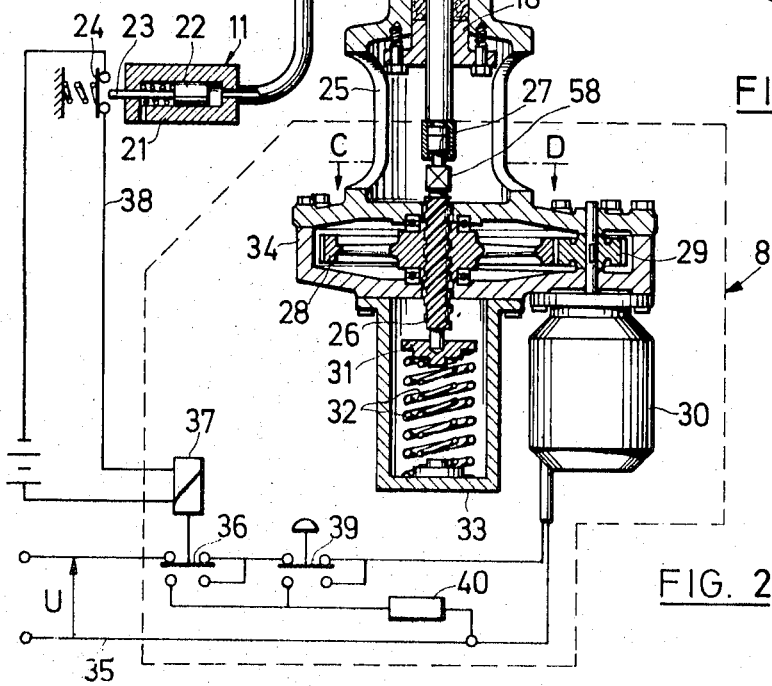

Referring to FIG. 2, the valve 7 comprises a spherical housing 12 provided with an inlet spigot 13 and an outlet spigot 14. The housing 12 is provided near the outlet spigot 14 with a valve seat 15 which cooperates with a closure member 16. This closure member 16 is carried on a spindle 17 which extends out of the housing 12 via a gland 18 and is connected to the drive 8. That side of the closure member 16 which is remote from the spindle 17 is provided with a rod 19 which, in order to guide the closure member 16, is guided slidably in a four-armed cross 20 (FIG. 3). The cross 20 is secured between the outlet spigot 14 and the adjoining pipe portion or line 6.

The pressure-sensitive element 11 is shown connected to the inlet spigot 13 and consists of a housing 21 and a piston 22 which is slidable therein and which acts on a switch 24 via a rod 23. As shown in FIG. 1, the pressure-sensitive element 11 can also be connected upstream of the valve 7.

Figure 4:
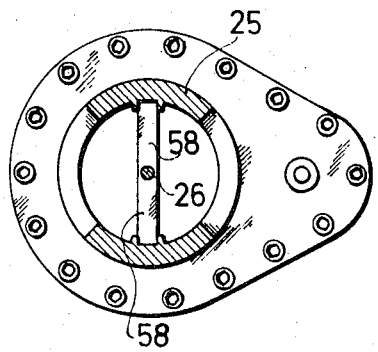
FIG. 4 illustrates a view taken on line C-D of FIG. 2.

The drive 8 for the valve 7 is connected to the valve housing 12 by a cage 25. In the cage 25, the spindle 17 is connected to a coarse-thread spindle 26 by a coupling 27. Near the coupling 27, the spindle 26 has two arms 58 which extend diametrically as far as the wall of the cage 25 (FIG. 4) and which are guided axially therein to secure the spindle 26 against turning while allowing the spindle 26 to move vertically as viewed. A gear-wheel 28 is disposed on the spindle 26 and has a hub provided with a screwthread corresponding to the coarse thread on the spindle 26. The gear-wheel 28 thus acts as a nut and with the spindle and hub constitute a non-self-locking nut and screw drive. The gear-wheel 28 cooperates with a gear-wheel 29 driven by a means for resisting the biasing force on the springs 32, i.e. by an electric motor 30. The gearwheel 29 and nut and screw drive constitute a transmission between the spindle 26 and motor 30. The bottom end of the spindle 26 as seen in FIG. 2 is carried in a plate 31 which bears on two coil springs 32 in a housing 33 flanged on a housing 34 enclosing the pair of gear-wheels 28, 29. These coil springs 32 serve to bias the spindle 26 and thus the closure member 16 under a biasing force towards an open end position in which the valve is fully open.

The means for resisting the biasing force of the springs 32 also includes an electrical circuit for energizing the motor 30. This circuit has a pair of leads 35 for the supply of current to the electric motor 30. The terminals of these leads 35 are connected to the output of the controller 9 (not shown) one of the leads 35 containing a means such as a switch 36 for releasing the motor 30. This switch 36 is actuated by a relay 37 whose winding is connected in a circuit 38 which also contains the switch 24 actuated by the pressure-sensitive element 11. In addition to the switch 36, the electric motor leads 35 also contains a manual release switch 39. A shunt-circuit means is formed by a resistor 40 together with the switches 36 and 39 and the electric motor 30 and this system comes into operation on disconnection of the voltage U.

The system shown in FIG. 2 operates as follows. When the closure member 16 is in the position illustrated, the by-pass pipe 6 is closed and the switches 24, 36, 39 occupy the position illustrated. The voltage U is applied to the leads 35 by the controller 9 and under the influence of this voltage, the electric motor 30 holds the valve 7 closed via the gear 26, 28, 29 against the force of the springs 32 biasing the valve open and the pressure acting on the closure member 16. If the pressure in the live steam line 2 is so high as to exceed the critical safety value to which the pressure-sensitive element 11 has been set, the piston 22 is moved to the left until the switch 24 opens. As a result, the relay 37 becomes de-energized and the switch 36 opens and, in so doing, closes the shunt-circuit system formed with the resistor 40. Opening of the switch 36 causes the closure force exerted by the electric motor 30 and acting on the closure member 16 to be discontinued. Since the coarse-thread spindle 26 does not have any self-locking property, the closure member 16 now moves in the opening direction under the influence of the springs 32 and the steam pressure acting in the valve housing 12, until reaching the end position and the valve 7 is fully open. This opening movement is delayed somewhat by switching in the resistor 40 since the resistor 40 constitutes a speed-limiting means.

Figure 5:
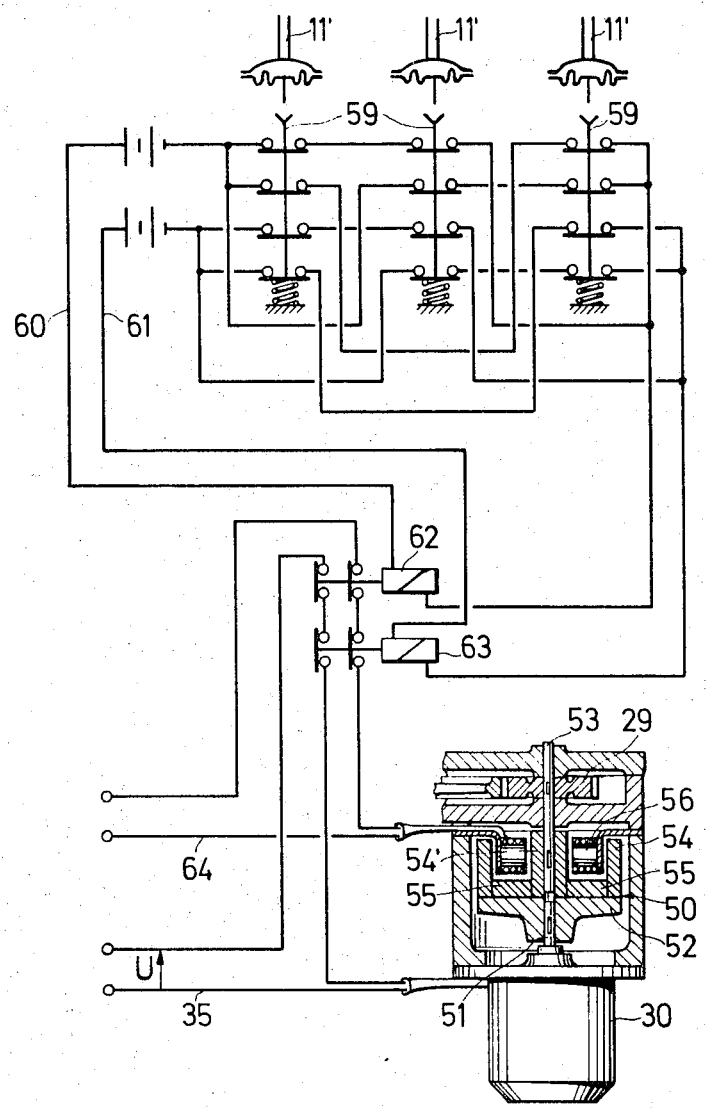
FIG. 5 illustrates a diagrammatic view of a motor having a clutch for disconnecting the motor from the valve closure member in accordance with the invention.

Referring to FIG. 5, an electro-magnetic clutch 50 is provided as the means for releasing the screw drive from the force exerted by the electric motor 30 to resist the biasing force of the springs (not shown) and fluid pressure. In this case, the electric motor shaft 51 carries a disc 52 which is axially slidable on the shaft 51 but which rotates therewith. Two rings 54 and 54' of ferromagnetic material are provided on the shaft 53 of the gear-wheel 29 and are connected by way of radially extending web portions 55 of non-ferromagnetic material. A number of stationary electromagnets 56, for example six, are distributed circumferentially in the annular chamber between the rings 54 and 54'.

FIG. 5 also shows an alternative form of pressure measuring means which, in this case, has a triplex form and is connected to the leads 35 of the electric motor 30 and to a circuit 64 for the windings of the electromagnets 56 via two 2-out-of-3 circuits. Each pressure-sensitive element 11' — which in this case is constructed as a capsule — is associated with a set of contacts 59 comprising four pairs of contacts which are disposed in two circuits 60, 61 in the manner known for 2-out-of-3 circuits. Each of the two circuits 60, 61 comprises a relay 62, 63, each of which actuates two pairs of contacts in the circuit 35 of the electric motor 30 and in the circuit 64 of the electromagnetic clutch 50. While the circuit 35 is fed with the output voltage U of the controller 9, the circuit 64 is provided with a fixed supply which is independent of the controller 9 and which delivers a constant voltage.

Provided that the critical safety value is not exceeded, the windings of the electromagnets 56 receive current, so that the disc 52 is attracted by the magnetized rings 54, 54' and the valve closure member (not shown) is held in the closure position by the driving force of the electric motor 30. If the critical safety value is exceeded, in which case at least two of the three pressure-sensitive elements 11' press the associated contact sets 59 downwards as viewed, the supply of current to the windings of the electromagnets 56 is broken and hence the magnetic force between the rings 54 and 54' and the disc 52 is interrupted. At that instant, the closure member 16 (not shown) is moved in the opening direction until reaching the end position, as described in connection with FIG. 2.

Figure 6:
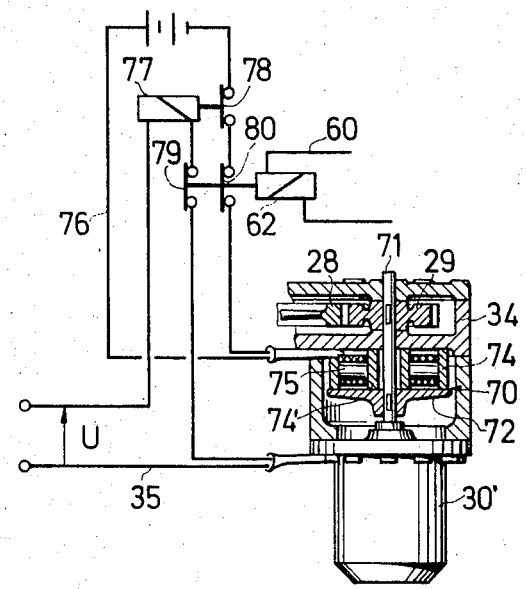
FIG. 6 illustrates a diagrammatic view of a motor having a brake for disconnecting the motor from the valve closure member in accordance with the invention.

Referring to FIG. 6, a brake motor 30' is used, which is provided with an electromagnetic brake 70. A disc 72 is axially slideable on but rotates with the shaft 71 of the motor 30', the shaft 71 driving a gear-wheel 29. Two rings 74 and 74' of ferromagnetic material are fixed on the housing 34 surrounding the pair of gear-wheels 28, 29, the inner ring 74' surrounding the shaft 71 with clearance. A number of electromagnets 75, for example four, are disposed radially in the annular chamber between the two rings 74, 74' and their windings are connected in a circuit 76 which is supplied with current independently of the circuit 35 for the brake motor 30'. The circuit 35 contains the winding of a relay 77 which actuates a switch 78 in the circuit 76. The circuits 35 and 76 contain switches 79 and 80 which are actuated jointly by the relay 62 whose winding is in the circuit 60, whose switches (not shown) are actuated by the pressure-sensitive element 11. In this example, as described in connection with FIG. 5, 2-out-of-3 circuits may against be provided.

When the switch 79 is in the position shown in FIG. 6, it is assumed that the voltage U from the controller 9 is zero, so that no force is applied to the brake motor 30'. At the same time, since the switches 78 and 80 are closed, the windings of the electromagnets 75 receive current so that the rings 74 and 74' attract the disc 72 and hold the motor 30' in the braked position. As in FIG. 2, the closure member of the valve 7 thus occupies the closed position. If the pressure of the fluid now exceeds the critical safety value, the relay 62 becomes dead and the switches 78 and 80 open, so that the circuits 35 and 76 are broken. Breaking of the circuit 76 has the effect that the relay 77 drops, the switch 78 opens and the electromagnetic brake 70 is released, so that as described in connection with FIG. 2 the closure member moves into the completely open position.

What is claimed is:

1. A valve system comprising a fluid flow control valve having a valve closure member for controlling a flow of fluid through said valve and means for biasing said closure member towards a predetermined end position under a biasing force; an electric motor for exerting a force to resist said biasing force; a transmission between said motor and said closure member, said transmission including a non-self-locking nut and screw drive; means for sensing a predetermined condition in the fluid upstream of said valve; and means for de-energizing said motor in response to said condition exceeding a preset value to allow said closure member to move to said end position under said biasing force.

2. A valve system as set forth in claim 1 which includes an electrical circuit connected to said motor to energise said motor whereby said energized motor provides the force resisting said biasing force and said means for de-energizing includes a switch in said electrical circuit for opening said circuit to said motor to de-energize said motor.

3. A valve system as set forth in claim 1 further comprising a speed limiting means for limiting the speed of said closure member in moving towards said end position on de-energizing of said motor.

4. A valve system as set forth in claim 3 which includes an electrical circuit connected to said motor to energize said motor whereby said energized motor provides the force resisting said biasing force and said means for de-energizing includes a switch in said electrical circuit for opening said circuit to said motor to de-energize said motor, said speed limiting means includes a resistor and means to switch said resistor into said motor circuit when said switch is opened.

5. A valve system comprising a fluid flow control valve having a valve closure member for controlling a flow of fluid through said valve and means for biasing said closure member towards a predetermined end position under a biasing force; means for resisting said biasing force including an electric motor for exerting a force to resist said biasing force; means for sensing a predetermined condition in the fluid upstream of said valve; means for releasing said means for resisting said biasing force in response to said condition exceeding a preset value to allow said closure member to move to said end position under said biasing force; and a speed limiting means for limiting the speed of said closure member in moving towards said end position on release of said means for resisting said biasing force.

6. A valve system comprising a fluid flow control valve having a valve closure member for controlling a flow of fluid through said valve and means for biasing said closure member towards a predetermined end position under a biasing force; an electric motor for resisting said biasing force; an electrical circuit connected to said motor to energize said motor whereby said energized motor provides a force resisting said biasing force; a transmission between said motor and said closure member, said transmission including a non-self-locking nut and screw drive; means for sensing a predetermined condition in the fluid upstream of said valve; and means including a switch in said electrical circuit for opening said circuit to said motor to deenergize said motor in response to said condition exceeding a preset value to allow said closure member to move to said end position under said biasing force.

7. A valve system comprising a fluid flow control valve having a valve closure member for controlling a flow of fluid through said valve and means for biasing said closure member towards a predetermined end position under a biasing force; an electric motor for resisting said biasing force; an electrical circuit connected to said motor to energize said motor whereby said energized motor provides a force resisting said biasing force; a transmission between said motor and said closure member, said transmission including a non-self-locking nut and screw drive; means for sensing a predetermined condition in the fluid upstream of said valve; and means including a clutch in said transmission between said motor and said screw drive for releasing said screw drive from said motor in response to said condition exceeding a preset value to allow said closure member to move to said end position under said biasing force.

8. A valve system comprising a fluid flow control valve having a valve closure member for controlling a flow of fluid through said valve and means for biasing said closure member towards a predetermined end position under a biasing force; an electric motor for resisting said biasing force; a transmission including a non-self-locking nut and screw drive; a brake on said transmission; means for sensing a predetermined condition in the fluid upstream of said valve; and means connected to said brake for selectively releasing said brake in response to said condition exceeding a preset value to allow said closure member to move to said end position under said biasing force.

* * * * *